United States Patent
Young (10) Patent No.: US 6,781,967 B1
(45) Date of Patent: Aug. 24, 2004

(54) SCHEDULING TECHNIQUES FOR RECEIVER DIRECTED BROADCAST APPLICATIONS

(75) Inventor: C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 756 days.

(21) Appl. No.: 09/650,332

(22) Filed: Aug. 29, 2000

(51) Int. Cl.[7] .......................... H04H 1/00; H04B 7/212; H04L 12/56

(52) U.S. Cl. ...................... 370/312; 370/348; 370/390; 370/443

(58) Field of Search ................................ 370/312, 314, 370/336, 347, 348, 390, 432, 437, 442, 443, 458

(56) References Cited

U.S. PATENT DOCUMENTS

| | | | |
|---|---|---|---|
| 4,504,946 A * | 3/1985 | Raychaudhuri | 370/322 |
| 4,763,322 A | 8/1988 | Eizenhofer | 370/337 |
| 5,012,469 A * | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A * | 3/1994 | Crisler et al. | 370/443 |
| 5,396,496 A * | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopoulos et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopoulos et al. | 370/330 |
| 5,598,417 A | 1/1997 | Crisler et al. | 370/348 |
| 5,625,629 A | 4/1997 | Wenk | 370/330 |
| 5,652,751 A | 7/1997 | Sharony | 340/2.4 |
| 5,696,903 A | 12/1997 | Mahany | 709/228 |
| 5,719,868 A | 2/1998 | Young | 370/436 |
| 5,742,593 A | 4/1998 | Sharony et al. | 370/347 |
| 5,748,362 A | 5/1998 | Delacourt et al. | 359/326 |
| 5,920,703 A | 7/1999 | Campbell et al. | 709/236 |
| 5,949,760 A | 9/1999 | Stevens et al. | 370/280 |
| 5,953,344 A | 9/1999 | Dail et al. | 370/337 |
| 5,983,259 A | 11/1999 | Campbell et al. | 709/200 |

(List continued on next page.)

OTHER PUBLICATIONS

Young, "USAP: A Unifying Dynamic Distributed Multichannel TDMA Slot Assignment Protocol," IEEE Milcom 1996, vol. 1, Oct. 1996.

L. Pond and V. Li, "Bridging the Gap Interoperability, Survivability, Security," 1989 IEEE Milcom, Conference Record, Volume 1 of 3.

Bittle, Caples, Young, "Soldier Phone: An Innovative Approach to Wireless Multimedia Communications," 1998 IEEE Milcom, vol. 3.

(List continued on next page.)

*Primary Examiner*—Hassan Kizou
*Assistant Examiner*—Timothy Lee
(74) *Attorney, Agent, or Firm*—Nathan O. Jensen; Kyle Eppele (57) ABSTRACT

Scheduling techniques for communication applications using receiver directed broadcast schemes are disclosed. The invention includes techniques for the implicit reservation of receive slots and techniques for the optimization of receiver directed broadcast schedules. The implicit reservation scheme includes the mechanics of implicit reservation. Implicitly reserved slots can be reclaimed by their owners. Further, simultaneous implicit reservations can be identified and resolved. Procedures are also provided for determining the number of channels and slots required to optimize a receiver directed broadcast schedule for a neighborhood of a given number of nodes.

22 Claims, 6 Drawing Sheets

U.S. PATENT DOCUMENTS

| | | | | |
|---|---|---|---|---|
| 6,018,528 | A | 1/2000 | Gitlin et al. | 370/436 |
| 6,031,827 | A | 2/2000 | Rikkinen et al. | 370/330 |
| 6,084,888 | A | 7/2000 | Watanabe et al. | 370/473 |
| 6,084,889 | A | 7/2000 | Murakami | 370/474 |
| 6,094,425 | A | 7/2000 | Auger et al. | 370/330 |
| 6,094,429 | A | 7/2000 | Blanchette et al. | 370/337 |
| 6,157,656 | A | 12/2000 | Lindgren et al. | 370/458 |
| 6,252,868 | B1 | 6/2001 | Diachina et al. | 370/347 |
| 6,256,304 | B1 | 7/2001 | Vayrynen | 370/350 |
| 6,256,477 | B1 | 7/2001 | Eidson et al. | 370/254 |
| 6,275,506 | B1 | 8/2001 | Fazel et al. | 370/459 |
| 6,304,559 | B1 | 10/2001 | Jacklin et al. | 370/310 |
| 6,310,867 | B1 | 10/2001 | Tat et al. | 370/254 |
| 6,314,084 | B1 | 11/2001 | Kahale et al. | 370/230 |
| 6,317,436 | B1 | 11/2001 | Young et al. | 370/443 |
| 6,324,184 | B1 | 11/2001 | Hou et al. | 340/7.43 |
| 6,331,973 | B1 | 12/2001 | Young et al. | 370/337 |
| 6,353,598 | B1 | 3/2002 | Baden et al. | 370/280 |
| 6,353,605 | B1 | 3/2002 | Rautanen et al. | 370/337 |
| 6,389,273 | B1 | 5/2002 | Brandenburg | 455/296 |
| 6,414,955 | B1 * | 7/2002 | Clare et al. | 370/390 |
| 6,466,793 | B1 | 10/2002 | Wallstedt et al. | 455/450 |
| 6,469,996 | B1 | 10/2002 | Dupuy | 370/337 |
| 6,487,186 | B1 | 11/2002 | Young et al. | 370/336 |
| 6,504,829 | B1 | 1/2003 | Young et al. | 370/337 |
| 6,553,424 | B1 | 4/2003 | Kranz et al. | 709/234 |
| 6,574,199 | B1 | 6/2003 | Young et al. | 370/254 |
| 6,574,206 | B2 | 6/2003 | Young | 370/337 |
| 6,600,754 | B1 | 7/2003 | Young et al. | 370/459 |
| 6,628,636 | B1 | 9/2003 | Young | 370/337 |
| 6,631,124 | B1 | 10/2003 | Koorapaty et al. | 370/337 |
| 2002/0001294 | A1 | 1/2002 | Amouris | 370/337 |
| 2002/0046381 | A1 | 4/2002 | Morris et al. | 714/752 |

OTHER PUBLICATIONS

IEEE Transaction on Information Theory, vol. IT–30, No. 4, Jul. 1984.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA:) A Distributed Heuristic for Building Wireless Datagram Networks," IEEE Military Communications Conference 1998, vol. 1 Ju et al. "An Optimal Topology–Transport Scheduling Method in Multihop Packet Radio Networks." IEEE/ACM Transactions on Networking. Jun. 1998. pp. 298–306.

Chakraborty et al. "Generic Algorithm for Broadcast Scheduling in Packet Radio Networks," Evolutionary Computation Proceedings, 1998. IEEE World Congress on Computational Intelligence. May 4–9, 1998. pp. 183–188.

Pond et al. "A Distributed Time–Slot Assignment Protocol for Mobile Multi–Hop Broadcast Packet Radio Networks," IEEE Milcom, 1989. Oct. 15–18, 1989. pp. 70–74.

Chou et al. "Slot Allocation Strategies for TDMA Protocols in Multihop Packet Radio Network." Eleventh Annual Joint Conference of the IEEE Computer and Communications Societies. May 4–8, 1992. pp. 710–716.

Oono et al. "Dynamic Slot Allocation Technology for Mobile Multi–Media TDMA Systems Using Distributed Control Scheme," IEEE. Oct. 12–16, 1997. pp. 74–78.

U.S. patent application Ser. No. 09/650,332, "Scheduling Techniques for Receiver Directed Broadcast Applications," filed Aug. 29, 2000, C. David Young.

U.S. patent application Ser. No. 09/562,549, "Efficient Grouping of Control and User Data," filed May 2, 2000, J.A. Stevens et al. U.S. patent application Ser. No. 09/303,802, "Clique Activation Multiple Access," filed Apr. 30, 1999, C. D. Young et al.

U.S. patent application Ser. No. 09/649,666, "Full Duplex Communication Slot Assignment," filed Aug. 29, 2000, C. David Young.

U.S. patent application Ser. No. 09/422,498, "Method and Apparatus for Managing Communication Resources Using Dynamic and Static Assignment of Communication Slots," filed Oct. 21, 1999, C. David Young.

U.S. patent application Ser. No. 09/340,881, "A Method and Apparatus for Managing Communication Resources Using Frame Fitting," filed Jun. 28, 1999, C. David Young.

U.S. patent application Ser. No. 09/649,802, "Maintaining an Adaptive Broadcast Channel Using Both Transmitter Directed and Receiver Directed Broadcast," filed Aug. 29, 2000, C. David Young.

U.S. patent application Ser. No. 09/552,144, "Method and Apparatus for Assigning Receive Slots in a Dynamic Assignment Environment," filed Apr. 19, 2000, C. D. Young. et al.

U.S. patent application Ser. No. 09/649,665, "Data Communication Techniques for Real Time Data Transmission," filed Aug. 29, 2000. T. Golubiewski et al.

I. Chlamtac and A. Farago, "An Optimal Access Protocol With Multiple Reception Capacity," University of Massachusetts, date uncertain, but is estimated to be 1993–1994.

U.S. patent application Ser. No. 09/340,585, "A Method And Apparatus For Managing Communication Resources Using An Adaptive Broadcast Cycle (ABC)",filed Jun. 28, 1999, C. David Young et al.

U.S. patent application Ser. No. 09/552,144, "Method And Apparatus For Assigning Receive Slots In A Dynamic Assignment Environment", filed Apr. 19, 2000, C David Young et al.

U.S. patent application Attorney Docket No. 99CR100/KE, "Maintaining An Adapative Broadcast Channel Using Both Transmitter Directed And Receiver Directed Broadcasts", C. David Young, filed on an even date herewith.

* cited by examiner

SCHEDULING TECHNIQUES FOR RECEIVER DIRECTED BROADCAST APPLICATIONS

CROSS REFERENCE TO RELATED APPLICATIONS

Cross-reference is made to related U.S. application Ser. No. 09/340,585, filed Jun. 28, 1999; U.S. application Ser. No. 09/552,144, filed Apr. 19, 2000; and an application entitled "Maintaining an Adaptive Broadcast Channel Using Both Transmitter Directed and Receiver Directed Broadcasts" by C. David Young filed on even date herewith.

FIELD OF THE INVENTION

The present invention generally relates to an improved dynamic assignment protocol, more particularly relates to improvements to receiver directed broadcast schemes, and even more particularly relates to implicit reservation and optimized scheduling techniques for receiver directed broadcast schemes.

BACKGROUND OF THE INVENTION

Figure 1:
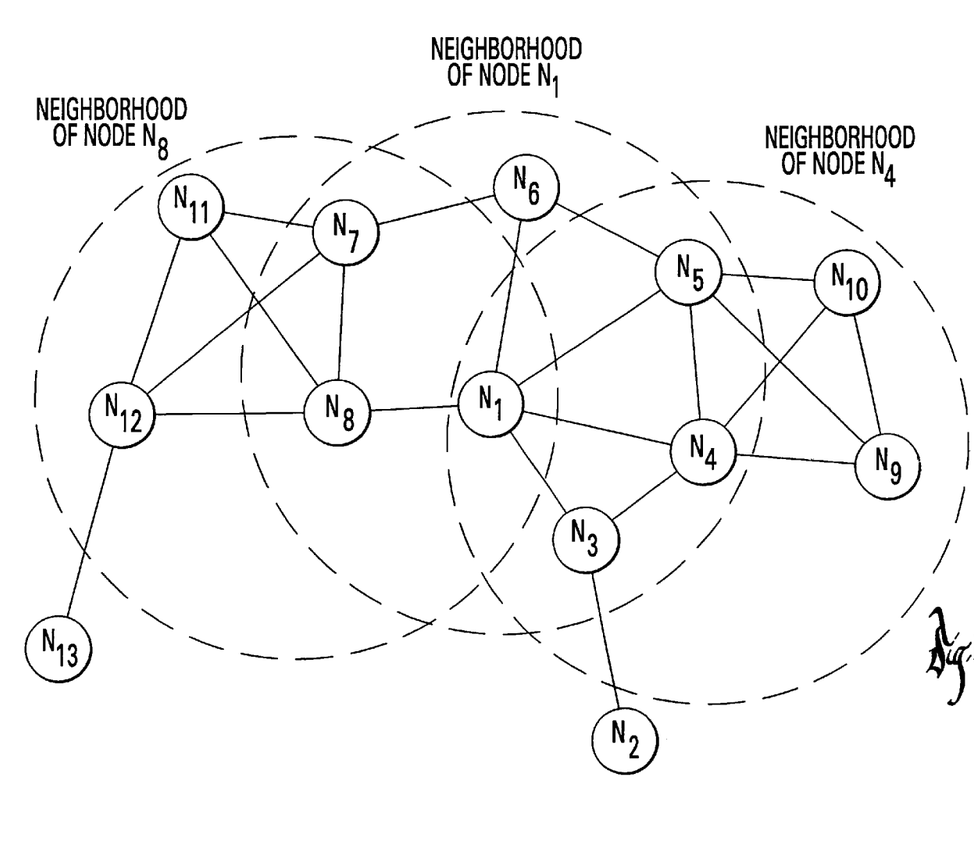
FIG. 1 is a diagram of a network of nodes, the diagram also illustrating the neighborhood associated with three of the nodes.

Mobile multi-hop packet radio networks are known for rapid and convenient deployment, self-organization, mobility, and survivability. Such a network is illustrated in FIG. 1. A transmission from one node, from node $N_1$ of FIG. 1 for example, can be broadcast to all nodes in its "neighborhood." Ultra-high frequency (UHF) systems generally have a neighborhood defined by nodes located within line of sight of the transmitting node. The nodes of such a neighborhood are said to be located within one "hop" of the transmitting node. In FIG. 1, for example, nodes $N_1$, $N_3$, $N_4$, $N_5$, $N_6$, $N_7$ and $N_8$ are members of the neighborhood surrounding node $N_1$.

Nodes $N_2$, $N_9$, $N_{10}$, $N_{11}$ and $N_{12}$ are each located two hops away from node $N_1$ and node $N_{13}$ can be said to be three hops away from node $N_1$. When data transmitted from node $N_1$ is to be propagated multiple hops, the data must be relayed by one or more of node $N_1$'s neighbors. For example, data transmitted by node $N_1$ can be relayed by its neighbor node $N_8$ to a node such as node $N_{12}$ that is located two hops from node $N_1$.

Receivers are generally capable of processing only one transmission at a time. When using such receivers, simultaneous transmissions (also known as collisions, contentions or conflicts) can be avoided by assigning a specific transmission time slot to each communicating node. Several approaches have been developed for assigning slots to nodes. The approach chosen for a particular application is generally a consequence of the type of network application (broadcast, multicast, unicast, datagrams, virtual circuits, etc.) at issue. Since the problem of optimally assigning slots is mathematically intractable, a heuristic approach has been applied. This approach resulted in the development of an integrated protocol that both chooses the number of slots to assign to each neighboring node and coordinates their activation in the network.

Many applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers.

The Unifying Slot Assignment Protocol (USAP), which is disclosed in U.S. Pat. No. 5,719,868, provides a protocol establishing such a communication system. USAP is a dynamic assignment protocol that monitors the RF environment and allocates channel resources on demand. It automatically detects and resolves contention between nodes for time slots, such contention arising for example from changes in connectivity. U.S. Pat. No. 5,719,868, issued Feb. 17, 1998, is hereby incorporated herein by reference in its entirety, including all drawings and appendices.

USAP permits a node to assign itself transmit slots based on information it has regarding when it is assigned to transmit and receive and when a neighboring node is scheduled to transmit. In one embodiment of USAP, receiver directed broadcast (RDB), a node can assign itself a receive slot instead of a transmit slot. For example, a node may need to assign itself a receive slot wherein it can receive from one, some or even all of its neighbors. This receiver directed type of assignment is disclosed in application Ser. No. 09/552,144, filed Apr. 19, 2000. The specification, including all drawing figures, of application Ser. No. 09/552,144, filed Apr. 19, 2000, is hereby incorporated herein by reference in its entirety.

There exists a need for further refinements and improvements to dynamic assignment protocol based systems using RDB. In particular, there exists a need for a technique that can implicitly reserve slots, for use in virtual circuits for example. In explicit reservation techniques, slots are taken from idle transmitters and are explicitly reassigned to nodes needing additional transmit capacity. In various applications, however, the use of explicit reservations can lead to an inefficient use of communication resources. Voice or video transmission applications, for example, can often tolerate a degree of initial packet loss and delay.

There is also a need to maximize throughput in systems using RDB schemes. For example, there exists a need for an optimized RDB scheduling technique that is capable, under heavy uniform traffic and for a given number of nodes and channels, of keeping each node busy all of the time. These needs are addressed and fulfilled by the detailed description provided below.

SUMMARY OF THE INVENTION

It is an object of the present invention to provide an improved technique for reserving slots in a receiver directed broadcast environment.

It is a feature of the present invention to utilize an implicit reservation of communication slots.

It is an advantage of the present invention to bring about a significant reduction of overhead by reducing the size of the control packet.

It is another object of the present invention to provide an improved technique for scheduling transmissions in a receiver directed broadcast environment.

It is another feature of the present invention to utilize an optimized RDB scheduling technique.

It is another advantage of the present invention to enable attainment of maximized throughput by keeping substantially every node busy transmitting or receiving nearly all of the time.

Thus, the present invention involves improved receiver directed broadcast systems and methods. The improvements can be carried out in an efficient, "waste-less" manner in the sense that throughput can be maximized or control overhead can be minimized. As noted herein, and as will be appreciated, the invention has several useful and valuable applications.

BRIEF DESCRIPTION OF THE DRAWINGS

The invention may be more fully understood by reading the following description of the invention, in conjunction with the appended drawings wherein.

DETAILED DESCRIPTION

Prior to the development of USAP, a heuristic approach was typically taken to design an application specific protocol that both chose the number of time slots to assign to each neighboring node and coordinated their activation. The incorporated USAP approach separates the slot assignment mechanism from the heuristic and creates a single generalized protocol for reliably choosing the slots and coordinating their activation. A dynamic assignment protocol such as USAP can be used to support higher level heuristics.

A node can transmit to its neighbors via essentially one of two different methods. One method, node activation, allows only one active transmitter in a neighborhood in a given time slot. The other method, link activation, can permit more than one simultaneous transmission in the same time slot.

Figure 2:
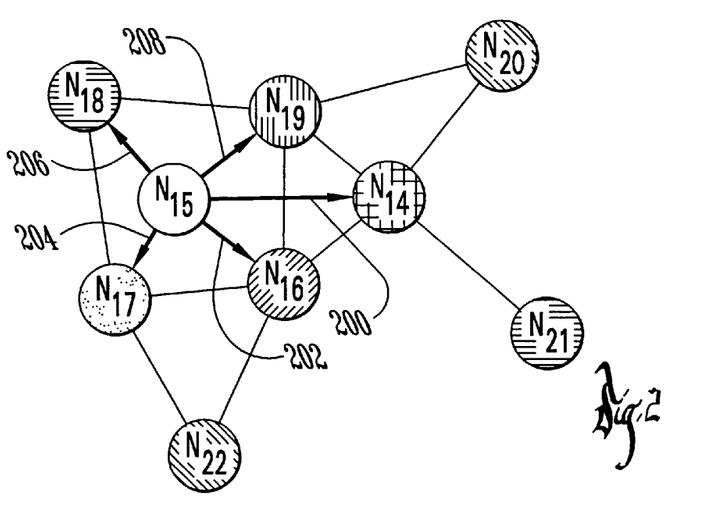
FIG. 2 is a diagram illustrating a node activation form of communication.

In the node activation technique, a single transmitting node communicates data to all of its neighbors simultaneously rather than on an individual basis. Node activation, also known as multicast or broadcast communication, is especially well suited for applications like address resolution and conferencing. The node activation technique is illustrated in FIG. 2. In FIG. 2, a transmitting node $N_{15}$ is simultaneously sending 200, 202, 204, 206, 208 the same broadcast communication to each of its neighbor nodes $N_{14}$, $N_{16}$, $N_{17}$, $N_{18}$ and $N_{19}$.

Figure 3:
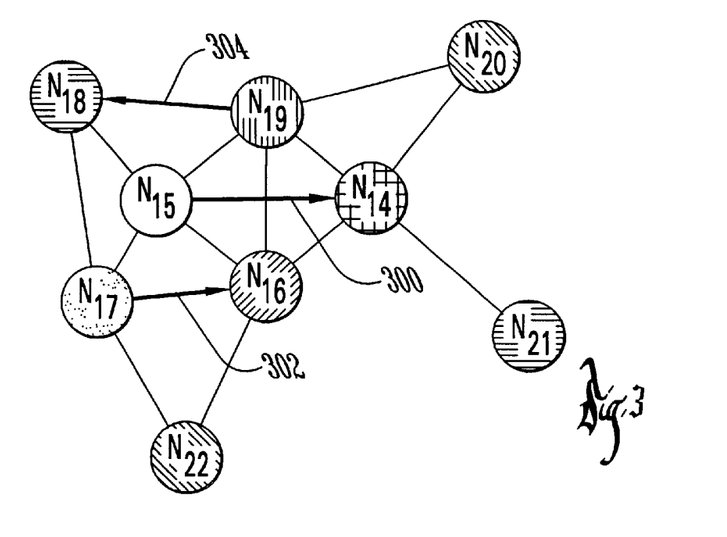
FIG. 3 is a diagram illustrating a link activation form of communication.

In the link activation technique, the transmitting node has only one intended receiver. Link activation, also known as unicast communication, better serves high volume point-to-point traffic. The link activation technique is illustrated in FIG. 3. In FIG. 3, three unicast transmissions are occurring simultaneously. Node $N_{15}$ is transmitting a unicast message 300 to node $N_{14}$, node $N_{17}$ is transmitting a unicast message 302 to node $N_{16}$ and node $N_{19}$ is transmitting a unicast message 304 to node $N_{18}$.

Figure 4:
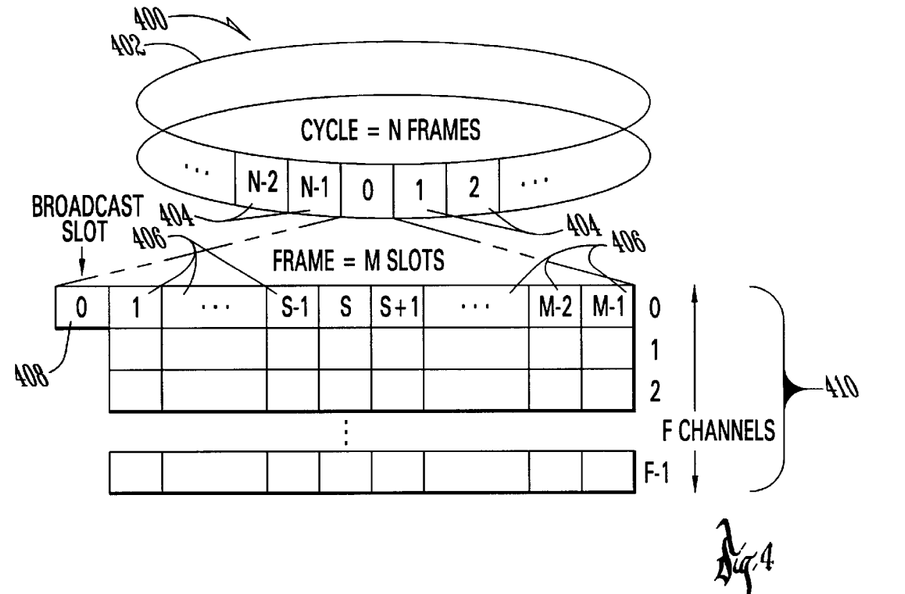
FIG. 4 is a diagram depicting an example of a time division multiple access structure that can be utilized with a dynamic assignment protocol such as USAP.

Referring to FIG. 4, a time multiplex structure 400 suitable for use with a USAP system is depicted. The time multiplex structure 400 of FIG. 4 is a time division multiple access structure (TDMA). One cycle 402 of the structure 400 includes "N" frames 404. The number of frames 404 required for a particular embodiment is determined by the specifics of the underlying application.

FIG. 4 also illustrates the structure of a representative frame of the cycle. The time allocated to the representative frame is shown divided into "M" distinct time slots 406. It will be appreciated that different numbers of time slots can be used in the various embodiments of the invention. The first slot of each frame 404 of the cycle 402 is a broadcast slot 408 for network management control packets. One of the N broadcast slots 408 is assigned to each node in the network. Therefore, for a network having N nodes, each node can transmit control packets once during each cycle 402. More than one broadcast slot per frame can be used if it is desired that each node have more broadcast capacity per cycle 402 or that more nodes can broadcast per cycle 402. Further, the broadcast slots can be dynamically assigned using the USAP approach described herein.

Each frame 404 can also include multiple frequency channels 410. In FIG. 4, "F" different frequency channels are illustrated in the representative frame. Different embodiments of the invention include different numbers of time slots 406, channels 410 and/or frames 404. To determine whether a slot and a channel are available for allocation, the USAP methodology of incorporated U.S. Pat. No. 5,719,868 may be applied. Other alternative methodologies exist, however, and can be used in lieu of the USAP methodology.

Dynamic assignment protocols, USAP for example, can include techniques for establishing and maintaining an adaptive broadcast channel using a transmitter directed broadcast or a receiver directed broadcast. Both types of broadcast can be based on a distance-2 vertex coloring of the network graph that provides contention-free transmissions by allowing reuse of any slot only after two hops. As noted in the incorporated material, other schemes can be employed as well. Another scheme, for example, may permit reuse of a slot only if separated by three (or more) hops.

Figure 5:
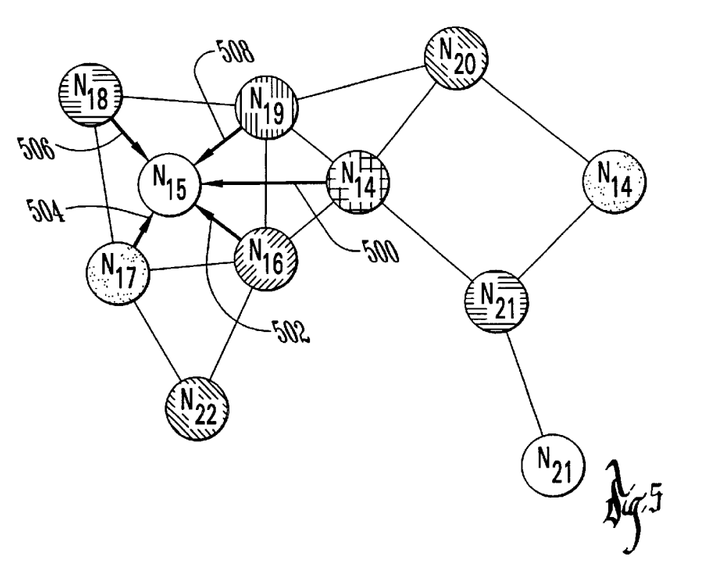
FIG. 5 is a diagram depicting a receiver directed form of communication.

FIG. 5 illustrates a receiver directed assignment of a receive slot. The map coloring is the same as that used in FIGS. 2 and 3. In FIG. 5, node $N_{15}$ has five neighbor nodes $N_{14}$, $N_{16}$, $N_{17}$, $N_{18}$, $N_{19}$. Node $N_{15}$ has assigned itself a receive slot. In one embodiment, a node such as node $N_{15}$ may assign to itself a receive slot that is designated for reception of a transmission from one neighbor node. In this embodiment, only one communication, the communication 500 from node $N_{14}$ to node $N_{15}$ for example, would take place during the receiver assigned receive slot.

In another embodiment, a node assigns itself a receive slot designated for use by two of its neighbors. Referring to FIG. 5, for example, such an embodiment could involve receive slot transmissions 500, 504 from node $N_{14}$ and node $N_{17}$. Other embodiments can permit three, four or more neighboring nodes to use the receive slot. In yet another embodiment, a node assigns itself a broadcast receive slot in which it can receive transmissions from all of its neighbors. FIG. 5 provides an example of a receiver directed broadcast slot wherein all five of node $N_{15}$'s neighbors are transmitting 500, 502, 504, 506, 508. It need not be required, however, that all neighbor nodes transmit during a receiver directed broadcast slot. In many applications, only one or a subset of the neighbors will transmit during a given RDB slot.

Although an RDB allocation is managed as a broadcast transmission at the receiver, it is in effect a unicast transmission in embodiments wherein only one transmitter can use it at a time. The RDB unicast scheme can be a time-multiplexed unicast scheme where a receiving node's neighbors take turns transmitting to it. This is in contrast to a dedicated unicast allocation scheme wherein a slot is reserved for one transmitter/receiver pair.

FIGS. 2, 3 and 5 are representative of just one of many different network configurations that can use RDB. It will be appreciated that network configurations of various sizes, shapes, proportions and connectivity can use RDB and the present invention. Further, nodes having a greater or a fewer number of neighboring nodes, for example any of the nodes of FIG. 5, can use RDB and the present invention.

Advantages of RDB unicast over dedicated unicast include less management overhead and more flexible sharing of channel resources. In addition, since transmission parameters can be adjusted for each individual receiver instead of for multiple receivers, RDB unicast enables a more efficient transmission parameter adaptation than does standard broadcast. The result is a significant improvement over standby broadcast techniques that must set the transmission rate to accommodate the slowest neighbor.

patent application Ser. No. 09/340,585, filed on Jun. 28, 1999, discloses a USAP Multiple Access system that is based on USAP. The entire specification, including any and all drawing figures and appendices, of application Ser. No. 09/340,585, filed Jun. 28, 1999, is hereby incorporated herein by this reference. In USAP Multiple Access, the transmitter based broadcast occurs in the broadcast slots and standby slots of the TDMA structure. Dedicated unicast reservations replace and use the standby slots as needed. The use of the standby slots is keyed to the broadcast slots so that a node that assigns itself a particular broadcast slot is entitled to the use of the corresponding standby slots.

The patent application Ser. No. 09/649,802 filed on even date herewith, by C. David Young, and entitled "Maintaining an Adaptive Broadcast Channel Using Both Transmitter Directed and Receiver Directed Broadcasts" discloses a related system, USAP Multiple Broadcast Access (USAP MBA). The entire specification, including any and all drawing figures and appendices, of the patent application Ser. No. 09/649,802 filed on even date herewith, by C. David Young, and entitled "Maintaining an Adaptive Broadcast Channel Using Both Transmitter Directed and Receiver Directed Broadcasts," is hereby incorporated herein by this reference. USAP MBA maintains the USAP MA relationship between the broadcast and standby slots, but replaces the standby transmitter based broadcast with standby RDB. In addition, the reservations are also based on RDB instead of dedicated unicast. The USAP MBA disclosure provides an example of a system within which the present inventions can be used. The present inventions can also be used with other systems. For example, they can be used with RDB systems having communication slots that are static and pre-assigned to a node, as well as with other types of dynamically allocated RDB systems.

An explicit reservation takes place whenever a node must take an affirmative step to secure a slot before transmitting it. This can occur, for example, in dynamic RDB schemes such as those noted above, or in RDB systems wherein communication slots are static and are pre-assigned to a node. By way of further example, an explicit reservation may be required when a node wishes to borrow a slot that has been previously, dynamically or statically, assigned to another node.

Figure 6:
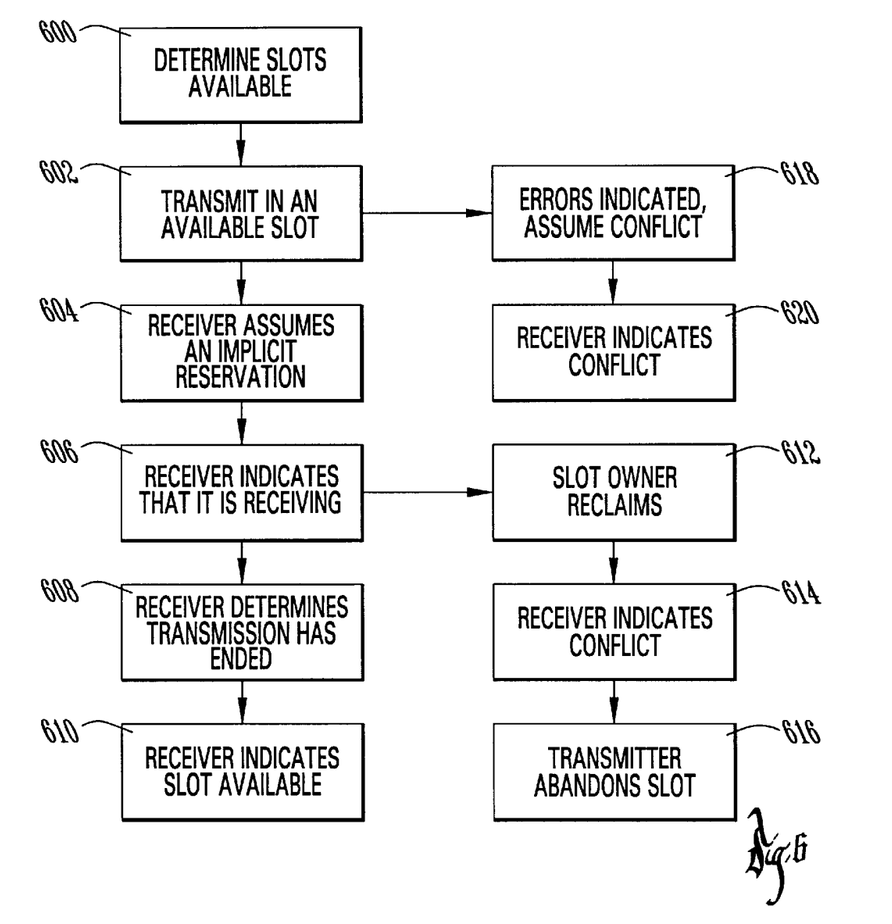
FIG. 6 is a flowchart depicting the steps related to an implicit reservation scheme.

In applications wherein some amount of initial packet loss and delay is tolerable, such as in voice or video applications, the explicit reservation technique is wasteful and inefficient. In such applications, an implicit reservations scheme, as explained below, has distinct advantages. Besides the synergism of allowing traffic to be sent on demand and without prior reservation, implicit reservations save a significant amount of room in the bootstrap by removing the field used for indicating the explicit reservation. An embodiment of an implicit reservation scheme is depicted in FIG. 6.

The implicit reservation scheme is based on the fact that, in a RDB environment, each of the nodes in the neighborhood knows that a non-transmitting node is always ready to receive on a particular channel. Therefore, if a node has excess traffic for a particular neighbor (beyond that of its normal broadcast and RDB slots) it can determine 600, via its stored information for example, which slots are not currently assigned to, reserved by, or otherwise blocked by other nodes. Upon identifying such slots, the node with excess communications can just start transmitting 602, without making an explicit reservation, in the unused slot or slots assigned to the intended receiver by the RDB scheme.

When implicit reservations are enabled, the receiving node assumes 604, upon receiving traffic in a slot, that the transmitting node has made an implicit reservation. The receiving node then announces 606 that it is busy receiving in the slot. In a USAP system, for example, it can start announcing a 'self receive' in its standby/reservation receive bootstrap record. As a result of the announcement, other transmitters are prohibited from implicitly reserving the slot.

Upon determining 608 that the traffic in the implicitly reserved slot has ceased, after waiting for a brief time out period for example, the receiving node can announce 610 that the slot is once again unassigned. Further, if desired, the neighbor node owning the slot can be permitted to reclaim 612 the slot for its own transmissions to the receiver associated with that RDB slot. In a USAP system, for example, a neighbor node can accomplish such a result by announcing a 'self transmit' in its standby transmit slot field. After determining that the owner is reclaiming the slot, the receiving node can announce 614 a 'conflict' and thereby cause any other neighbor node to abandon 616 its implicit or explicit reservation.

Similarly, if numerous packets containing errors are received 618, the receiving node can be allowed to assume that more than one neighbor is trying to implicitly reserve the same slot. In such an event, the receiving node can announce 620 a conflict in the slot. Upon receiving notification of the conflict, the node or nodes implicitly reserving the slot will abandon it.

The savings obtained via the use of implicit reservations can be seen by considering the USAP MBA bootstrap for example. In one embodiment of USAP MBA, explicit reservations are encoded as two maps of one bit fields. These fields correspond to up to two neighbors' receive slots that reserving node would like to use. The size of the two fields are calculated as follows:

3 bits*2 neighbors=6 bits, and 1 bit*8 slots*2 neighbors=16 bits.

The value of the bit indicates whether the slot is an unassigned slot or a self transmit slot.

Overall, the USAP MBA bootstrap requires a total of 50 bits, about 9 bytes. Use of an implicit reservation scheme instead of the explicit reservation scheme, however, permits the reservation transmit slot fields to be omitted from the bootstrap. Consequently, in this example embodiment, the size of the bootstrap can be reduced 44 percent to 28 bits.

FIGS. 2 and 5 respectively illustrate transmitter based broadcast and receiver directed broadcast. In broadcast slots, a node such as node $N_{15}$ can use its slot to transmit, as in FIG. 2, to all of its neighbors at once. Likewise, in the context of FIG. 5, a node such as node $N_{15}$ can receive from any of its neighbors (if, for example, only one neighbor transmits at a time).

To prevent RDB collisions, neighbors needing to transmit data to a node can be scheduled unique communication slots, for example unique slot and channel combinations, which are keyed to the broadcast slot each is assigned. When desired, an "optimal RDB schedule" can be implemented. As noted, the optimal RDB schedule can also be used with other systems, such as RDB systems having communication slots that are static and pre-assigned to a node, as well as other types of dynamically allocated RDB systems. An optimal schedule can be designed, for example, to fulfill the following objectives:

1. Use as many channels as possible to allow the maximum number of simultaneous transmissions to occur.
2. If a node wishes to use another node's transmission opportunity, it has an equal probability of effecting its own transmit and receive opportunities.
3. The schedules for sparser neighborhoods are imbedded within the schedules for denser neighborhoods.

The justification for the first objective is that, under a uniform traffic load, maximum throughput can be achieved if all nodes are kept busy 100% of the time either transmitting or receiving. The number of channels (C) required to achieve this end is related to the number of nodes in the neighborhood (N), by the equation C=N/2. Likewise the number of slots (S) required, derives from the fact that every node must both transmit and receive from N−1 other nodes. Thus, the relation S=2(N−1) is obtained.

Figure 7:
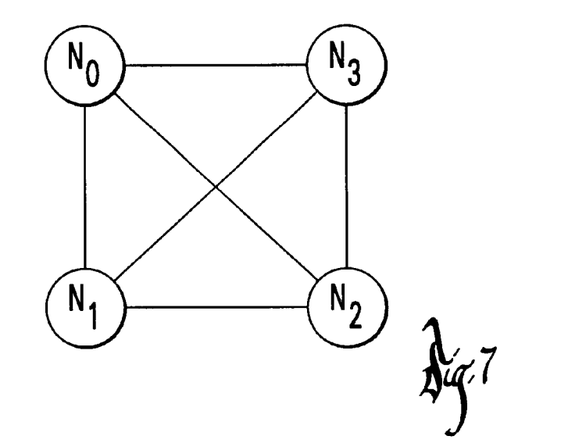
FIG. 7 depicts a four node neighborhood.

The second objective is subtler and will be explained with the help of the following four node schedule. FIG. 7 depicts a four node neighborhood. The table below relates two channels (C1 and C2) to six slots (S0, S1, S2, S3, S4 and S5) for four nodes ($N_0$, $N_1$, $N_2$ and $N_3$) of FIG. 7.

TABLE 1

Optimized Four-Node Schedule

| Txer → Rxer | C0 | C1 |
|---|---|---|
| S0 | $N_0 \to N_1$ | $N_3 \to N_2$ |
| S1 | $N_1 \to N_0$ | $N_2 \to N_3$ |
| S2 | $N_0 \to N_2$ | $N_1 \to N_3$ |
| S3 | $N_2 \to N_0$ | $N_3 \to N_1$ |
| S4 | $N_0 \to N_3$ | $N_2 \to N_1$ |
| S5 | $N_3 \to N_0$ | $N_1 \to N_2$ |

In this schedule, node $N_0$ uses (S0, C0) as its primary slot for transmitting to node $N_1$. However, if node $N_2$ or node $N_3$ currently have no traffic for node $N_1$, then node $N_0$ can use their slots, (S3, C1) and (S4, C1), on a reservation basis to communicate with node $N_1$. Node $N_0$'s use, however, of either one of these slots will reduce its own transmit and receive opportunities, (S3, C0) and (S4, C0). Consequently, node $N_0$ must weigh its decision about which additional slots to reserve for transmissions to node $N_1$, against its needs to communicate with the other nodes in its neighborhood. Presumably this decision is easier if all nodes have an equal choice between receive and transmit opportunities.

The optimal schedule for two nodes is (S0, C0) and (S1, C0). Notice that the two node schedule is imbedded in the four node schedule. A scheduling embodiment having the smaller schedules imbedded in the larger schedule has the added benefit of permitting a smooth transition between neighborhoods of different densities (such as according to the USAP MA Adaptive Broadcast Cycles for example). A schedule satisfying all three objectives is considered "optimal."

Figure 8:
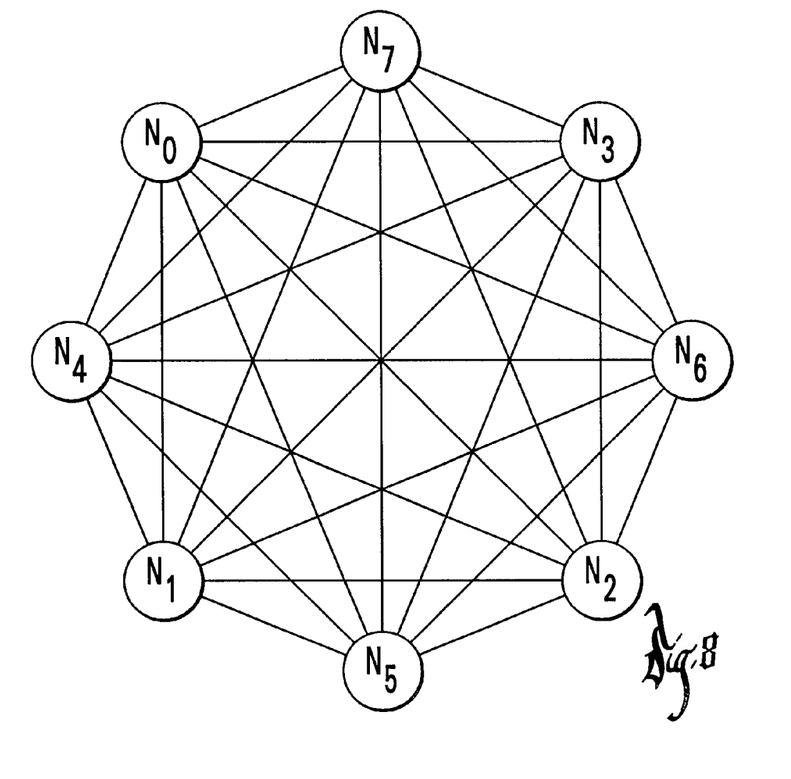
FIG. 8 depicts an eight node neighborhood.

FIG. 8 depicts an eight node neighborhood. An optimal eight node schedule for the neighborhood of FIG. 8 is listed below. Note that, in this embodiment, the optimal four node schedule is imbedded within this optimal eight node schedule. Four channels (C=N/2) and fourteen time slots (S=2(N−1)) are required for the optimal schedule for this eight node neighborhood.

TABLE 2

Optimized Eight-Node Schedule

| Txer → Rxer | C0 | C1 | C2 | C3 |
|---|---|---|---|---|
| S0 | $N_0 \to N_1$ | $N_3 \to N_2$ | $N_4 \to N_5$ | $N_7 \to N_6$ |
| S1 | $N_1 \to N_0$ | $N_2 \to N_3$ | $N_5 \to N_4$ | $N_6 \to N_7$ |
| S2 | $N_0 \to N_2$ | $N_1 \to N_3$ | $N_4 \to N_6$ | $N_5 \to N_7$ |
| S3 | $N_2 \to N_0$ | $N_3 \to N_1$ | $N_6 \to N_4$ | $N_7 \to N_5$ |
| S4 | $N_0 \to N_3$ | $N_2 \to N_1$ | $N_4 \to N_7$ | $N_6 \to N_5$ |
| S5 | $N_3 \to N_0$ | $N_1 \to N_2$ | $N_5 \to N_6$ | $N_7 \to N_4$ |
| S6 | $N_0 \to N_4$ | $N_1 \to N_6$ | $N_2 \to N_5$ | $N_3 \to N_7$ |
| S7 | $N_0 \to N_5$ | $N_1 \to N_4$ | $N_6 \to N_2$ | $N_7 \to N_3$ |
| S8 | $N_0 \to N_6$ | $N_2 \to N_4$ | $N_5 \to N_3$ | $N_7 \to N_1$ |
| S9 | $N_0 \to N_7$ | $N_3 \to N_4$ | $N_5 \to N_2$ | $N_6 \to N_1$ |
| S10 | $N_1 \to N_5$ | $N_2 \to N_6$ | $N_4 \to N_3$ | $N_7 \to N_0$ |
| S11 | $N_1 \to N_7$ | $N_3 \to N_5$ | $N_4 \to N_2$ | $N_6 \to N_0$ |
| S12 | $N_2 \to N_7$ | $N_3 \to N_6$ | $N_4 \to N_0$ | $N_5 \to N_1$ |
| S13 | $N_4 \to N_1$ | $N_5 \to N_0$ | $N_6 \to N_3$ | $N_7 \to N_2$ |

Thus, two, four and eight node RDB cycles can be handled by five channels. To scale to sixteen nodes optimally requires eight channels and thirty slots. An acceptable schedule can be achieved, however, by using five channels and 48 slots (i.e. there are 120 ways of taking two of eight nodes, multiplied by two for transmit and receive, and divided by five channels). In general, $$S \equiv \binom{N}{2} \times \frac{2}{C} \equiv \frac{N!}{2!(N-2)} \times \frac{2}{C} \equiv \frac{N(N-1)}{C}.$$

Accordingly, a 32 node schedule with five channels requires 199 slots. It will be appreciated that the present invention can be further expanded to include neighborhoods having more than 32 nodes.

Figure 9:
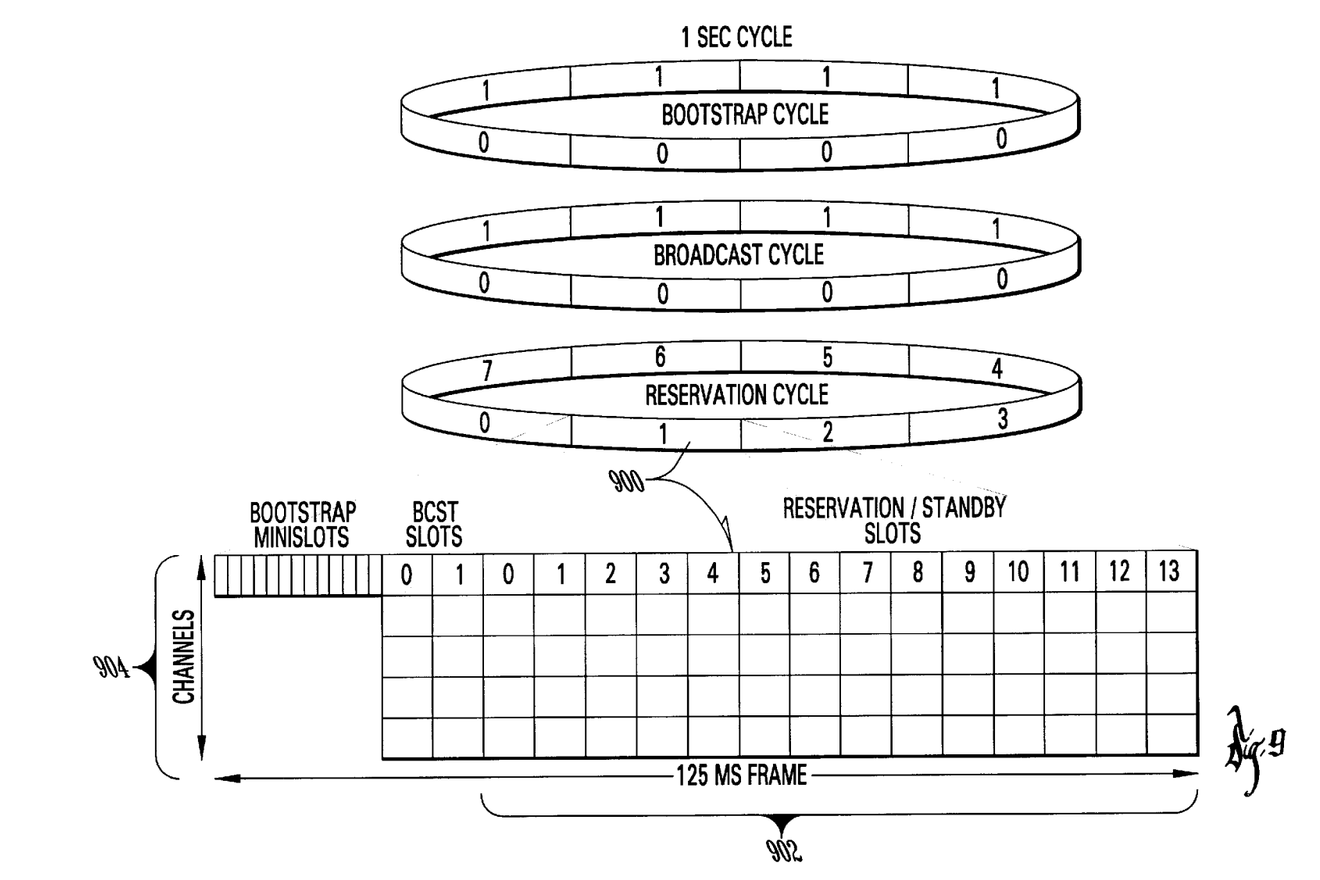
FIG. 9 depicts a frame suitable for use with the optimized eight node schedule of FIG. 8.

FIG. 9 presents a frame optimized for the eight node schedule. In this schedule, an eight node neighborhood would have a maximum latency of 125 ms since every node can transmit to every other node in every frame. Note that this is the same latency as the current USAP MA eight node standby broadcast schedule, the difference being that each node has seven transmit slots instead of one.

Even though the RDB slots of the embodiment of FIG. 9 are 50% shorter (due to the need for fourteen slots instead of eight), throughput is still tripled when most of the traffic is point-to-point. Having only five channels begins to be detrimental in the 16 and 32 node schedules, however, where latencies are about two and 3.5 times that of the standby broadcast schedule. In such environments, for example, a sixteen channel structure can be implemented for optimally handling neighborhoods of up to 32 nodes.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method for optimizing a communication schedule in a network having nodes communicating via scheduled communication slots on a time multiplex basis, comprising the steps of:
   establishing a receiver directed broadcast communication schedule having a plurality of communication slots;
   associating a communication link between at least two nodes with at least one communication slot of the communication schedule; and
   optimizing the communication schedule to prevent collisions by determining the number of communication slots required to maximize the number of simultaneous transmissions in the network, wherein said optimizing step comprises determining how many communication slots are required for a given number of communication channels by solving $S=N(N-1)/C$, where C represents the number of channels, S represents the number of communication slots being determined, and N represents the number of nodes in the neighborhood of the receiving nodes.

2. The method of claim 1, wherein said optimizing step further comprises constructing the receiver directed broadcast communication schedule such that a node's needs to communicate with nodes in its own neighborhood are balanced against said node's needs to use a communication slot associated with another node.

3. The method of claim 1, wherein said optimizing step results in a nesting of communication schedules such that a communication schedule for a smaller number of nodes is imbedded within a communication schedule for a larger number of nodes.

4. A communication apparatus capable of participating in a network having nodes communicating via scheduled communication slots on a time multiplex basis, comprising:
   a wireless communication component;
   a memory component, storing a receiver directed broadcast communication schedule of a plurality of communication slots and also storing data associating at least one communication slot of the plurality of communication slots with a communication link between at least two network nodes, said memory component also storing instructions for dynamically managing the receiver directed broadcast communication schedule and for optimizing the receiver directed broadcast communication schedule to prevent collisions by determining how many communication slots are required to maximize the number of simultaneous network transmissions; and
   a processor component, coupled with said wireless communication component and with said memory component, capable of executing the instructions for dynamically managing the receiver directed broadcast communication schedule and capable of executing the instructions for optimizing the receiver directed broadcast communication schedule, wherein said memory component stores instructions for optimizing that determine how many communication slots are required for a system having a given number of communication channels by solving $S=N(N-1)/C$, where C represents the number of communications channels, S represents the number of communication slots being determined, and N represents the number of neighboring nodes.

5. The communication apparatus according to claim 4, wherein said memory component stores instructions for optimizing that ensure that a node's needs to communicate with nodes in its own neighborhood are balanced against its needs to use a communication slot with which it has not been associated.

6. The communication apparatus according to claim 4, wherein said memory component stores instructions for optimizing such that a receiver directed broadcast communication schedule for a network with a smaller number of nodes is imbedded within a receiver directed broadcast communication schedule with a larger number of nodes.

7. A method for optimizing a communication schedule in a network having nodes communicating via scheduled communication slots on a time multiplex basis, comprising the steps of:
   establishing a receiver directed broadcast communication schedule having a plurality of communication slots;
   associating a communication link between at least two nodes with at least one communication slot of the communication schedule; and
   optimizing the communication schedule to prevent collisions by determining the number of communication slots required to maximize the number of simultaneous transmissions in the network, wherein said optimizing step comprises determining how many communication slots are required for a given number of communication channels by solving $C=N/2$, and calculating how many communication slots are required by solving $S=2(N-1)$, where C represents the number of communication channels being determined, S represents the number of communication slots being determined, and N represents the number of nodes in the neighborhood of the receiving nodes.

8. The method of claim 7, wherein said optimizing step further comprises constructing the receiver directed broadcast communication schedule such that a node's needs to communicate with nodes in its own neighborhood are balanced against its needs to use a communication slot associated with another node.

9. The method of claim 7, wherein said optimizing step results in a nesting of communication schedules such that a communication schedule for a smaller number of nodes is imbedded within a communication schedule for a larger number of nodes.

10. A method for optimizing a communication schedule in a network having nodes communicating via scheduled communication slots on a time multiplex basis, comprising the steps of:
    establishing a receiver directed broadcast communication schedule having a plurality of communication slots;
    associating a communication link between at least two nodes with at least one communication slot of the communication schedule; and
    optimizing the communication schedule to prevent collisions by determining the number of communication slots required to maximize the number of simultaneous transmissions in the network, wherein said optimizing step results in a nesting of communication schedules such that a communication schedule for a smaller number of nodes is imbedded within a communication schedule for a larger number of nodes.

11. The method of claim 10, wherein said optimizing step further comprises constructing the receiver directed broadcast communication schedule such that a node's needs to communicate with nodes in its own neighborhood are balanced against its needs to use a communication slot associated with another node.

12. The method of claim 10, wherein said optimizing step comprises determining how many communication slots are required for a given number of communication channels.

13. The method of claim 12, wherein said optimizing step solves S=N(N−1)/C to determine how many communication slots are required, where C represents the number of channels, S represents the number of communication slots being determined, and N represents the number of nodes in the neighborhood of the receiving nodes.

14. The method of claim 12, wherein said optimizing step comprises the step of calculating how many communication channels are required by solving C=N/2, and calculating how many communication slots are required by solving S=2(N−1), where C represents the number of communication channels being determined, S represents the number of communication slots being determined, and N represents the number of nodes in the neighborhood of the receiving nodes.

15. A communication apparatus capable of participating in a network having nodes communicating via scheduled communication slots on a time multiplex basis, comprising:
 a wireless communication component;
 a memory component, storing a receiver directed broadcast communication schedule of a plurality of communication slots and also storing data associating at least one communication slot of the plurality of communication slots with a communication link between at least two network nodes, said memory component also storing instructions for dynamically managing the receiver directed broadcast communication schedule and for optimizing the receiver directed broadcast communication schedule to prevent collisions by determining how many communication slots are required to maximize the number of simultaneous network transmissions; and
 a processor component, coupled with said wireless communication component and with said memory component, capable of executing the instructions for dynamically managing the receiver directed broadcast communication schedule and capable of executing the instructions for optimizing the receiver directed broadcast communication schedule, wherein said memory component stores instructions for optimizing that determine how many communication slots are required for a system having a given number of communication channels according to C=N/2 and S=2(N−1), where C represents the number of channels being determined, S represents the number of communication slots being determined, and N represents the number of neighboring nodes.

16. The communication apparatus according to claim 15, wherein said memory component stores instructions for optimizing that ensure that a node's needs to communicate with nodes in its own neighborhood are balanced against said node's needs to use a communication slot with which it has not been associated.

17. The communication apparatus according to claim 15, wherein said memory component stores instructions for optimizing such that a receiver directed broadcast communication schedule for a network with a smaller number of nodes is imbedded within a receiver directed broadcast communication schedule with a larger number of nodes.

18. A communication apparatus capable of participating in a network having nodes communicating via scheduled communication slots on a time multiplex basis, comprising:
 a wireless communication component;
 a memory component, storing a receiver directed broadcast communication schedule of a plurality of communication slots and also storing data associating at least one communication slot of the plurality of communication slots with a communication link between at least two network nodes, said memory component also storing instructions for dynamically managing the receiver directed broadcast communication schedule and for optimizing the receiver directed broadcast communication schedule to prevent collisions by determining how many communication slots are required to maximize the number of simultaneous network transmissions; and
 a processor component, coupled with said wireless communication component and with said memory component, capable of executing the instructions for dynamically managing the receiver directed broadcast communication schedule and capable of executing the instructions for optimizing the receiver directed broadcast communication schedule;
 wherein said memory component stores instructions for optimizing such that a receiver directed broadcast communication schedule for a network with a smaller number of nodes is imbedded within a receiver directed broadcast communication schedule with a larger number of nodes.

19. The communication apparatus according to claim 18, wherein said memory component stores instructions for optimizing that ensure that a node's needs to communicate with nodes in its own neighborhood are balanced against said node's needs to use a communication slot with which it has not been associated.

20. The communication apparatus according to claim 18, wherein said memory component stores instructions for optimizing that determine how many communication slots are required for a system having a given number of communication channels.

21. The communication apparatus according to claim 20, wherein said memory component stores instructions for optimizing that determine how many communication slots are required by solving S=N(N−1)/C, where C represents the number of communications channels, S represents the number of communication slots being determined, and N represents the number of neighboring nodes.

22. The communication apparatus according to claim 20, wherein said memory component stores instructions for optimizing that calculate how many communication channels are required according to C=N/2, and that calculate how many communication slots are required according to S=2(N−1), where C represents the number of channels being determined, S represents the number of communication slots being determined, and N represents the number of neighboring nodes.

* * * * *